United States Patent [19]

Johnson et al.

[11] 4,367,631
[45] Jan. 11, 1983

[54] AIR CONDITIONING APPARATUS AND METHODS USING UNDERGROUND DUCT

[75] Inventors: Harold R. Johnson, P.O. Box 849, Monroe, N.C. 28110; Harold F. McKnight; Richard Ferguson, both of Charlotte, N.C.

[73] Assignee: Harold R. Johnson, Monroe, N.C.

[21] Appl. No.: 159,671

[22] Filed: Jun. 16, 1980

[51] Int. Cl.³ .............................................. F25D 23/12
[52] U.S. Cl. .......................................... 62/79; 62/260; 237/2 B
[58] Field of Search ..................... 237/2 B; 62/260, 79, 62/238.6, 238.7, 235.1; 126/427; 165/29

[56] References Cited

U.S. PATENT DOCUMENTS

| | | |
|---|---|---|
| 2,680,354 | 6/1954 | Gygax . |
| 4,066,118 | 1/1978 | Goettl ................................ 62/235.1 |
| 4,242,872 | 1/1981 | Shaw ................................ 126/427 X |

Primary Examiner—William E. Wayner

Attorney, Agent, or Firm—Richards, Shefte & Pinckney

[57] ABSTRACT

An underground duct is connected to other ductwork and controls associated with a building for automatically selectively passing outdoor air through the underground duct to the normally outdoor coils of a heat pump, recirculating air through the underground duct to the heat pump outdoor coils and back through the underground duct, and passing outdoor air directly to the heat pump outdoor coils and also passing outdoor air through the underground duct to recondition it, in order to achieve optimum heat pump efficiency for selectively heating and cooling the building. Alternatively, air from the underground duct or from outdoors is selectively passed directly into the building for optimum cooling thereof while a dehumidifier is used to remove latent heat from the air; and other heat sources may be used with direct recirculation of air through the building and addition of a portion of tempered air from the underground duct for slightly pressurizing the building interior with heated air.

9 Claims, 3 Drawing Figures

FIG. 1

AIR CONDITIONING APPARATUS AND METHODS USING UNDERGROUND DUCT

BACKGROUND OF THE INVENTION

The underground air from caves has been known for centuries to have a very uniform temperature and to be useful for maintaining such items as wines and cheeses at desirably even temperatures. Many attempts have been made to use this uniform underground temperature to advantage in heating or cooling aboveground structures, and such efforts are exemplified in U.S. Pat. Nos. 1,830,099, 1,974,244, 2,077,406, 2,119,038, 2,217,190, 2,554,661, 2,564,215, 2,628,374, 2,680,354 and 2,793,509.

So far as is known, there is no generally available and commercially successful heating, ventilating, and air conditioning or air treatment system using underground air. The known prior art has not disclosed the features of the present invention, but has relied on outdoor air passing through an underground duct as the source and sink for heat for heating and cooling a space, whether direct or by means of an intermediate heat pump. The prior art has ignored the fact that outdoor air or air recirculated through an underground duct is often more advantageous for heat exchange purposes than outdoor air after passing through the underground duct, and that less use of the underground duct also allows it to be reconditioned, rejuvenated, or recharged as a heat source or sink by passing outdoor air therethrough and back to the outdoors when the underground duct is not being used as the heat source or sink.

On the other hand, the present invention provides methods and apparatus for automatically heating or cooling a space by use of air as the heat exchange medium, whether outdoor air direct or through an underground duct, or air recirculated through an underground duct, whichever is the most advantageous source or sink for heat, and for reconditioning the underground duct for further and more advantageous use during periods when it is not being used as a heat source or sink but outdoor air is being used directly therefor. The present invention also provides for removal of latent heat from underground duct air, recirculated air, or outdoor air when they are used directly and exclusively for cooling a conditioned space without use of mechanical refrigeration apparatus for removal of sensible heat from the air. Such use of the most advantageous heat sources and sinks should result in substantial economies in use of electrical or other power for heating, ventilating, and air conditioning purposes, and should also require less underground duct work than would be required by the apparatus of the prior art.

Furthermore, such use of the most advantageous heat sources and sinks should provide a more even load on the compressor of a heat pump in the system, thereby prolonging its useful life. Use of water, including collected rainwater, to permeate the ground around the underground duct, might provide improved heat transfer between duct and ground and within the ground, as mentioned in the aforesaid patents.

SUMMARY OF THE INVENTION

Briefly described, the present invention provides heat pump apparatus for exchanging heat between indoor air in a space at the working side thereof and air outside the space at the reservoir side of the heat pump apparatus including a heat pump having means for exchange of heat with the air in the space and means for exchange of heat with the air outside the space, underground duct means outside the space, and selective means for moving ambient outside air through the duct past the means for exchange of heat with the outside air and moving the outside air directly through the means for exchange of heat with the outside air. Further included may be additional selective means for recirculating air to and from the heat pump through the duct for exchanging heat between the recirculating air and the duct and between the recirculating air and the heat pump. Further energy-conserving apparatus may be provided for cooling the air in the space including means for recirculating passage of air through the space and the duct for removal of sensible heat from the recirculating air during its passage through the duct and means other than the duct for removal of latent heat from the recirculating air, the latent heat removal means having little effect on the sensible heat in the recirculating air.

Briefly, the present invention provides an energy-conserving method for exchanging heat between air and a heat pump at the reservoir side thereof for enabling heat exchange between the working side of the heat pump and indoor air thereat, the method including the use of underground duct means and including passing ambient outdoor air to the heat pump through the duct means for exchanging heat between the passing air and the duct means when such exchange is favorable to condition the temperature of the ambient air for increased efficiency of operation of the heat pump as compared to passing ambient outdoor air directly to the heat pump for exchanging heat therewith, and selectively discontinuing the aforesaid passing ambient outdoor air to the heat pump etc. while passing ambient outdoor air directly to the heat pump for directly exchanging heat therebetween when the temperature of the ambient air passing directly to the heat pump is favorable for increased efficiently of operation of the heat pump as compared to passing air through the duct means to the heat pump. A further step may include selectively discontinuing the just-aforesaid passing ambient outdoor air to the heat pump through the duct means etc. while passing ambient outdoor air directly to the heat pump for directly exchanging heat therebetween when the temperature of the ambient air passing directly to the heat pump is favorable for increased efficiency of operation of the heat pump as compared to passing air through the duct means to the heat pump. A further step may include selectively discontinuing the just-aforesaid passing ambient outdoor air to the heat pump through the duct means etc. and the just-aforesaid passing ambient outdoor air directly to the heat pump etc. while recirculating air to and from the heat pump through the duct means for exchanging heat between the recirculating air and the duct means and between the recirculating air and the heat pump when such exchange is favorable to condition the temperature of the recirculating air for increased efficiency of operation of the heat pump as respectively compared to passing ambient outdoor air through the duct means to the heat pump and passing ambient outdoor air directly to the heat pump. A further energy-conserving method for treating the air in the space may include the steps of recirculating the air through the space and an underground duct for removal of sensible heat from the air by the duct, and recirculating the air through means other than the duct for removal of latent heat therefrom.

The energy-conserving method of exchanging heat with the heat pump may be used for warming indoor air by passing ambient air through the duct means to the heat pump when the ambient air would be warmed thereby and selectively passing air directly to the heat pump when the ambient air would be cooled by passing through the duct means; and conversely, the method may be used for cooling indoor air by passing ambient air through the duct means to the heat pump when the ambient air would be cooled thereby, and passing air directly to the heat pump when the ambient air would be warmed by passing through the duct means. When the method is used for warming indoor air, air may be recirculated to and from the heat pump through the duct means when the air recirculated from the heat pump to the duct means would be warmer than ambient outdoor air; and conversely, when the method is used for cooling indoor air, air may be recirculated to and from the heat pump through the duct means when the air recirculated from the heat pump to the duct means would be cooler than ambient outdoor air. The method may include a time period during which it is used for warming indoor air and ambient air is passed through the duct means to the heat pump when the ambient air would be warmed thereby, it is passed directly to the heat pump when the ambient air would be cooled by passing through the duct means, and air is recirculated to and from the heat pump through the duct means when the air recirculated from the heat pump to the duct means would be warmer than ambient outdoor air; and the method may include another time period when it is used for cooling indoor air and ambient air is passed through the duct means to the heat pump when the ambient air would be cooled thereby, and passed directly to the heat pump when the ambient air would be warmed by passing through the duct means.

Preferably, the embodiment of the present invention disclosed herein includes selective means for moving other outside air through the duct for return directly to the outside simultaneously with moving outside air directly to the means for exchange of heat with the outside air at the heat pump. The preferable energy-conserving method of exchanging heat with the heat pump includes an additional step of passing other ambient outdoor air through the duct directly back to the outdoors for exchanging heat between the duct and the other air passing therethrough, this additional step being performed at the same time as the step of passing ambient outdoor air directly to the heat pump.

In the preferred embodiment of the present invention, the energy-conserving apparatus for cooling air in the space by recirculating passage of air through the space and the duct is characterized further by means for heating and recirculating air through the space only, means for slightly pressurizing the space with outdoor air drawn through the duct and tempered in temperature thereby, and means for selectively rendering inoperative the means for recirculating passage of air through the duct and the means for removal of latent heat and rendering operative the means for heating and recirculating air through the space only. The energy-conserving method for treating air in the space in the preferred embodiment includes the additional steps of selectively discontinuing the steps of recirculating the air through the space and the underground duct for removal of sensible heat from the air by the duct and recirculating the air through means other than the duct for removal of latent heat, heating and recirculating air through the space only, and slightly pressurizing the space with outdoor air drawn through the duct and tempered in temperature thereby.

In the preferred embodiment, the energy-conserving apparatus for cooling air in the space by recirculating passage of air through the space and the duct for removal of sensible heat from the air further includes means for supplying ambient outdoor air to the space and to the latent heat removal means in suitable quantity for cooling the air in the space, means for recirculating through the space but not through the duct a portion of the air in the space for its evaporative cooling comfort effect, and means for automatically selectively rendering the means for recirculating passage of air through the space and the duct inoperative and the just-described means operative during periods in which the ambient outdoor air has greater cooling effect in the space than would the removal of sensible heat from the recirculating air during its passage through the duct; and the preferred embodiment also includes means for circulating other ambient outdoor air through the underground duct back to the outdoors for removal of heat from the duct during the periods in which the means for recirculating passage of air through the space and the duct is rendered inoperative. The preferred method of using the apparatus of the preferred embodiment includes the additional steps of selectively discontinuing the steps of recirculating the air through the space and the underground duct for removal of sensible heat from the air by the duct and recirculating the air through means other than the duct for removal of latent heat therefrom, while supplying ambient outdoor air to the space and the latent heat removal means for cooling the air in the space and recirculating through the space but not through the underground duct a portion of the air in the space for its evaporative cooling effect, these steps occurring during periods in which the ambient outdoor air has greater cooling effect in the space than would the removal of sensible heat from the air by the duct as when recirculating the air through the space and the duct. This preferred method also includes a further step of circulating other ambient outdoor air through the underground duct back to the outdoors for removal of heat from the duct during such periods. The preferred method includes recirculating the air sequentially through the the duct, the latent heat removal means, and the space, whereby the latent heat removal means removes a maximum amount of latent heat and a minimum amount of sensible heat from the air and has no significant effect on the sensible heat in the air. In the preferred embodiment of the present invention, the air moving through the duct means travels therethrough in a spiraling fashion induced by means included in the duct means for increasing the heat exchanging capability thereof and for inducing spiraling currents in air moving therethrough.

DESCRIPTION OF THE PREFERRED EMBODIMENTS

Figure 1:
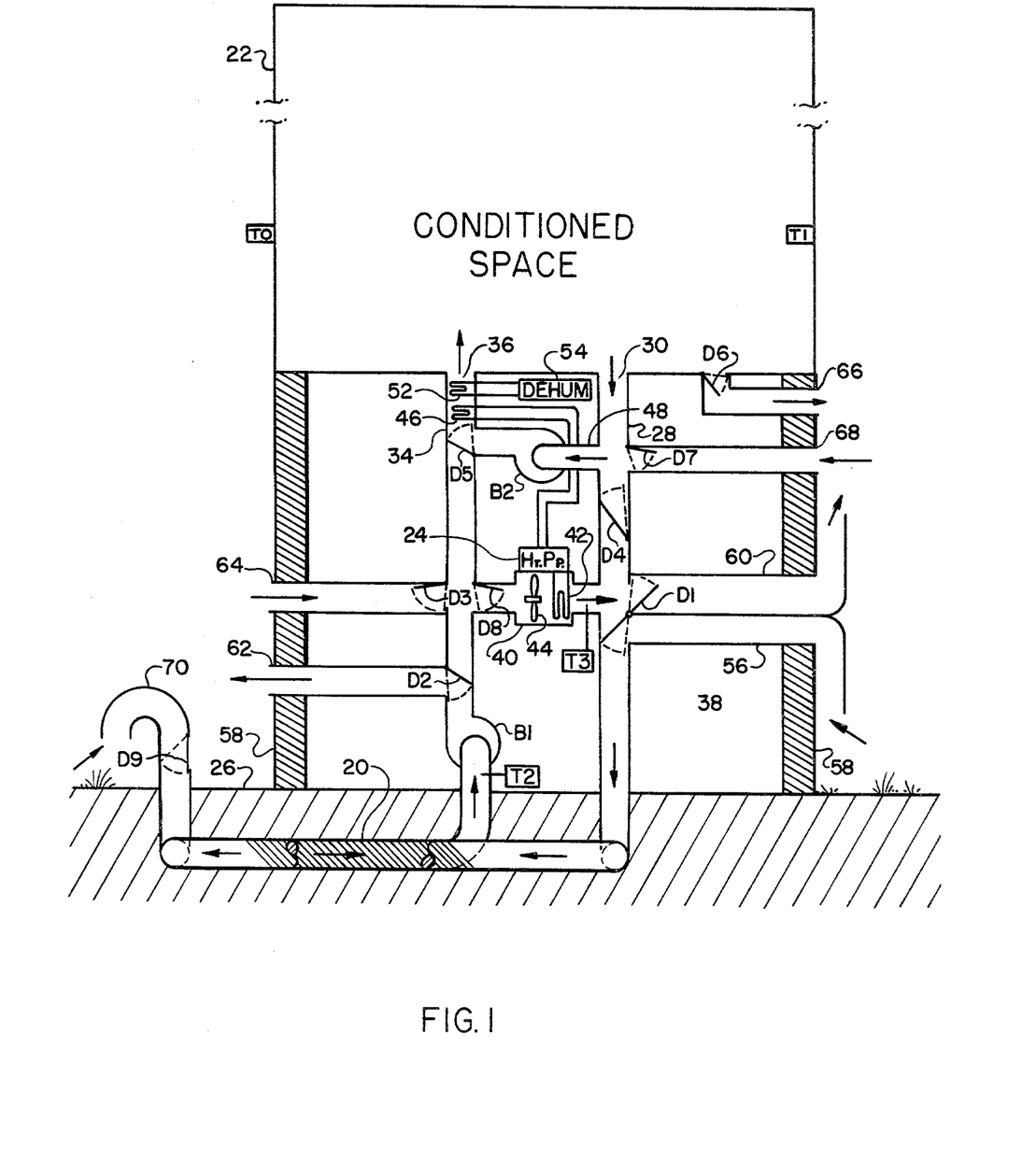
FIG. 1 is a schematic elevational view of a building structure embodying the present invention and having a heated, ventilated, and air conditioned space and ductwork and apparatus therefor, a basement-like substructure, and an underground duct associated therewith.

The present invention provides means and methods for improved use of air circulated through an underground duct 20 for providing a heat source and sink for heating or cooling the interior of a building structure 22 either by indirect means such as a heat pump 24 or by direct introduction of air from the underground duct to the building 22. The preferred embodiment of the invention as shown in FIG. 1 would provide advantageous flexibility in utilization of the underground duct 20 which extends at one end thereof above the ground level 26 to an inlet extension 28 for return of air from the building 22 through an inlet 30. At its outer end, the duct 20 extends above the ground level 26 to the suction side of a duct blower B1 which has an outlet duct 34 extended from the pressure side thereof to an outlet 36 to the interior of the building structure 22. The inlet extension 28, the blower B1 and the outlet duct 34 would normally be located within the substructure, crawl space, or basement area 38 of the building structure 22.

Heat pump ductwork 40 connects the inlet extension 28 and the outlet duct 34 for communication therebetween so that air may be passed through the ductwork 40 over a conventional outdoor heat exchange coil 42 of the heat pump 24 (under the force of the heat pump air fan 44 when suitable as explained hereinafter).

The conventional indoor working coil 46 of the heat pump 24 is disposed within the outlet duct 34 near the outlet 36 for modifying the temperature of air flowing through duct 34 to the building 22 for heating or cooling the building 22 as desired.

Inlet extension 28 and outlet duct 34 communicate also through the building recirculation ductwork 48 which has the building recirculation blower B2 disposed therein for recirculation of air to and from the building 22 without use of the underground duct 20 when suitable as explained hereinafter. The dehumidifier coils 52 of a dehumidifier 54 are disposed also within the outlet duct 34 near the outlet 36 for removing latent heat or moisture from air flowing through duct 34 to the building 22 when desired as further described hereinafter.

An intake duct 56 extends through the wall structure 58 of the basement area 38 from outdoors to connect and communicate with the inlet extension 28 near the ground level 26, while an exhaust duct 60 is disposed adjacent to the duct 56 on the building 22 side thereof and is also connected to and communicates with the inlet extension 28 and extends outwardly therefrom through the wall 58 to the outdoors. A butterfly damper D1 disposed at the juncture of ducts 56 and 60 with the inlet extension 28 may be positioned as shown in solid lines to allow free communication from the inlet extension 28 to the outdoors through the ducts 56 and 60 and to close off the upper and lower portions of the inlet extension 28 from each other, or as shown in broken lines to close off ducts 56 and 60 from communication with the inlet extension 28 and allow free communication between the upper and lower portions of the extension 28.

A second exhaust duct 62 disposed near the blower B1 connects and communicates with the outlet duct 34 and extends therefrom through the wall 58 to the outdoors and has a damper D2 disposed at its juncture with the duct 34 for closing off communication therebetween when in broken line position and for opening up the aforesaid communication and closing off the duct 34 above the duct 62 when in solid line position as shown in FIG. 1. A second intake duct 64 connects and communicates with duct 34 above the duct 62 and likewise extends to the outdoors through the wall 58 and has disposed at its juncture with duct 34 a damper D3 which in its broken line position closes off communication through duct 64 to the outdoors and in its solid line position allows such communication.

A damper D4 disposed in inlet extension 28 closes off the extension 28 between the heat pump ductwork 40 and the recirculation ductwork 48 when in solid line position and does not obstruct the extension 28 when in broken line position. A damper D5 disposed at the juncture of outlet duct 34 and the recirculation ductwork 48 closes off communication therebetween when in broken line position, and allows such communication but closes off duct 34 below the ductwork 48 when in solid line position as shown in FIG. 1.

A third exhaust duct 66 extends from the building 22 to the outdoors and has a damper D6 disposed at its juncture with the building 22 for allowing communication between the building 22 and the outdoors when in solid line position and closing off such communication when in broken line position. A third intake duct 68 connects and communicates with the extension 28 and extends therefrom through the wall 58 to the outdoors and has a damper D7 disposed therein for closing off communication with the outdoors when in broken line position and allowing such communication in solid line position. A damper D8 disposed in the heat pump ductwork 40 closes communication therethrough between the extension 28 and the duct 34 when in its broken line position and allows such communication and use of the heat pump 24 when in solid line position.

The underground duct 20 extends generally horizontally at a suitable depth below the ground level 26 to take advantage of the generally stable temperature of the earth at a depth of 10–12 feet, e.g., forming a horizontal loop with ends upturned to extend above ground as mentioned hereinbefore. The loop shape is not essential to the present invention, and the duct 20 might be disposed in S-curves or otherwise, but it is advantageous that any adjacent runs of duct 20 be well separated to provide the maximum practical heat source or sink in the surrounding earth. A portion of the duct 20 is shown broken out from the near most portion of the aforesaid loop as shown in FIG. 1 to show more clearly the nature of the loop. The underground duct 20 is preferably formed of 15 inch or larger copper alloy galvanized steel spiral corrugated culvert pipe which is commercially available, the corrugations having a helical angle of about 45° and serving in the present invention both to increase the surface contact area with the surrounding earth for improved heat transfer from the duct 20 thereto and also to induce spiraling air currents within the duct 20 for improved heat transfer between the duct 20 and air passing therethrough. Both the diametrical size and length of the duct 20 must be empirically determined by particular climate, soil, air flow, and heat load characteristics to suit each particular installation of the present invention to provide a sufficient heat source and sink. It is thought that in some instances one foot of length of 15 inch underground duct 20 may support 10 square feet of residential building floor space.

An inlet duct 70 may be provided at some intermediate location along the underground duct 20 to communicate therewith and extend upwardly to the outdoor air above the ground level 26, and the duct 70 may be provided with a damper D9 disposed therein to close off communication between the duct 20 and the outdoors when in broken line position as seen in FIG. 1 and to allow such communication when in solid line position, whereby the portion of the duct 20 on the far side of the duct 70 from the blower B1 could be allowed to rest during periods of low heat transfer by suitable controls.

Alternatively also, the heat pump 24 and the associated ductwork 40, coil 42, fan 44, and damper D8 might be omitted and any other heat source such as electrical resistance heater coils, hot water coils from a residential water heater or a solar hot water system or other, might be substituted to supply heat to the coil 46 for heating the building 22.

Figure 2:
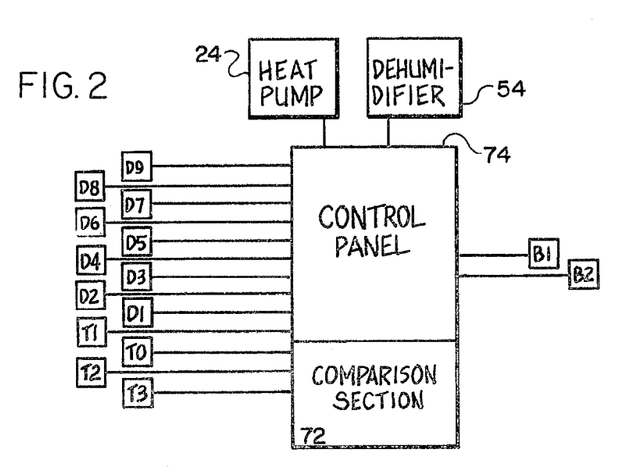
FIG. 2 is a schematic diagram of the control and operating elements of the preferred embodiment of the invention.

As shown in FIG. 1, thermostats T0, T1, T2, and T3 respectively monitor the temperatures in the ambient outdoor air, the indoor air, the air returning from the underground duct 20, and the air in the ductwork 40 after heat has been absorbed therefrom or rejected thereto by the coil 42 of the heat pump 24. Such thermostats may be of the TS8501 and TS8100 series solid state sensing types sold by the Barber-Colman Company, Rockford, Ill., for the thermostats T0 and T1 respectively, and of the similar TS8201 series duct type for the thermostats T2 and T3. As shown in FIG. 2, the thermostats T0, T2 and T3 are connected to a comparison section 72 of a control panel 74, and the thermostat T1 is connected conventionally to the panel 74 for controlling operation of the apparatus to the heating or cooling mode of operation thereof as desired and to turn the apparatus off and on. One or more CC8111 differential controllers (not shown) as also sold by Barber-Colman may be included in the comparison section 72 for comparing the temperatures monitored by the thermostats T0, T2, and T3 as explained hereinafter, and instructions provided by the Barber-Colman Company are sufficient for those ordinarily skilled in the art to connect the thermostats and the controllers CC8111.

The dampers D1-D9 may be equipped with Barber-Colman Company MA5330 series two position hydraulic actuators for dampers and valves for actuation of the dampers D1-D9 through suitable conventional linkages connected therebetween which are well known to those ordinarily skilled in the heating, ventilating, and air conditioning art. Such actuators are for purposes of this disclosure considered to be included in the dampers D1-D9 shown schematically in FIG. 1, and as shown in FIG. 2 the connections from the control panel 74 to the dampers D1-D9 may be electrical connections to the actuators for control of the damper positions by the control panel 74 as described hereinafter. MP5220 series proportional actuators from the Barber-Colman Company might be used alternatively in place of some of the dampers, D5 and D7 e.g., if modulated amounts of outdoor air were desired, or other desired results made the more sophisticated controls therefor worthwhile, and such uses are well known to those versed in the art.

Although the use of air from underground has long been recognized for heating and cooling purposes, there appears to be no widely successful apparatus or method therefor, and the present invention is believed to use the just-described novel arrangement of apparatus by improved methods which will commercially prove the economic value of underground air. The earth underground has no significant heating or cooling qualities of itself, but is less and less affected by surface temperature conditions the farther underground, so that at any given depth the temperature lies on some natural gradient from the extremely hot core of the earth to whatever the particular climatic temperature may be at the earth's surface or ground level 26 thereabove. At some depth, such as 10 feet e.g., the earth or soil surrounding the underground duct 20 forms a heat source, reservoir, or sink with a natural temperature in a useful range (for utilization directly or by a heat pump) which probably peaks from sun heat on the earth's surface in late summer or fall and falls to a low point from cold winter weather at ground level in late winter or spring, considering the heat conductance characteristics of earth or soil. An underground duct at such a depth serves as means to remove heat from the reservoir or source consisting of the earth surrounding the underground duct, and it will warm cooler air passed therethrough to a temperature near that of the earth immediately surrounding the underground duct. In turn, the earth immediately surrounding the underground duct will be cooled and will gradually absorb heat from greater and greater distances from the underground duct, gradually lowering ground temperature to increasing distances from the underground duct. Continuous use of an underground duct as a heat source would probably require an uneconomic length, depth, or diameter of underground duct, but fortunately, in many climates the normal temperature variation from day to night allows use of the underground duct during the cooler periods and recharging or reheating thereof during warmer periods. Suitable methods of use of the underground duct can then hold the size of the underground duct to a minimum. Vice-versa, the underground duct can be used as a heat sink in hot weather during the hottest times of day, and may be cooled back toward its natural temperature during cooler periods. Since the natural underground temperature is normally lower than that required for comfort cooling, air from the underground duct may be used directly for cooling a building, or as the heat sink for a heat pump therefor.

In the Piedmont section of North Carolina, for example, at a depth of 10-12 feet, the temperature probably varies from a minimum of about 50° F. to a maximum of about 70° F. from winter to summer. Considering that a temperature of 65°-70° is desirable in a building in the winter, air from an underground duct at 50° is not useful for direct heating, but provides a far better source of heat for a heat pump than ambient outdoor air at temperatures below 50°, because the coefficient of performance of a typical heat pump such as a General Electric Weathertron Model No. BWR936 conventionally using ambient outdoor air as a heat source may drop off from about 3.0 at 50° outdoor air temperature to about 1.5 at 10° outdoor air temperature. The coefficient of performance is defined as the ratio of the heat pumped to the equivalent heat corresponding to the power required to operate the heat pump. Therefore, for the most efficient operation, when the ambient outdoor air temperature is above the underground duct air temperature, the ambient outdoor air should be blown directly on the heat pump outdoor heat exchange coils; when the outdoor air falls below the underground duct air temperature, the outdoor air should be forced through the underground duct to be warmed before blowing it on the heat pump outdoor coils; and when the air coming off the heat pump outdoor coils is warmer than the outdoor air, then air should be recirculated through the underground duct, past the heat pump outdoor coils, then back through the underground duct, ad infinitum, until the outdoor air again becomes warmer than air coming off the heat pump outdoor coils.

Thus, through use of an adequately-sized underground duct which can supply air to the outdoor coils of a heat pump at a temperature of 40°–50° e.g. during periods when outdoor air is below 50°, not only should the coefficient of performance be maintained above about 2.7, but also the heat pump should be enabled to supply adequate heat to carry the heated building through cold weather where conventional practice is to turn off the heat pump and use electrical resistance heating because a typical heat pump may lose about 40 percent of its heating capacity as outdoor air temperature falls from 50° to 20°, and over 50 percent at 10°, in addition to the drastic drop in coefficient of performance. Such a resort to resistance heating is not only relatively quite expensive for the electricity consumed and for the additional electrical equipment, but in widespread use can throw a tremendous additional peak load on the electric power generating facilities during already-critical peak load periods.

In addition to making the most efficient use of a heat pump through the use of air from an underground duct, the apparatus and methods of the present invention allow the underground duct to be rewarmed during those periods when the outdoor air is warmer than the underground duct air (in Piedmont North Carolina temperatures frequently show 30° low-high variation, thus freezing at night and 50°–60° during the day), thereby recharging the heat source, which has been drained of heat during the previous period when the outdoor air was colder than the underground duct. Thus, a smaller, or less extensive underground duct would be required than if the underground duct were only allowed to rest during warm outdoor air periods, while warmer air is supplied directly to the outdoor coil of the heat pump than if the outdoor air were routed through the underground duct (where it would be cooled) during warm outdoor air periods.

In the analogous situation for cooling with a heat pump, the coefficient of performance drops typically from about 3.25 at 85° outdoor air temperature to about 2.7 at 100° and 2.2 at 115°, so that use of underground duct air at 75° or 80° when the outdoor air is warmer will again result in increased coefficient of performance as well as increased capacity as compared to use of outdoor air direct to the heat pump outdoor coils. Analogously, outdoor air temperatures frequently fall to 60° at night after 85°–90° or higher days, thereby allowing discharging, so to speak, the heat sink which has been pumped full of heat during the warmer periods by blowing outdoor air through the underground duct back to the outdoors during the cooler periods.

Alternatively, cooling might be obtained even more economically by direct use of underground duct air recirculated through a space in sufficient volume to overcome the normal heat gain therein. Here again, outdoor air should be used when it is cooler than air from the underground duct and outdoor air should be used to discharge the heat sink formed by the underground duct when the outdoor air is cooler than the underground duct.

Contrary to some prior art teachings, humidity or latent heat content of the recirculated or the outdoor air used for cooling would appear to present a problem, and the air should therefore be passed over dehumidifier coils (maintained at temperatures just above 32° F.) where moisture (latent heat) would be removed from the air without appreciably lowering the sensible heat or dry bulb temperature of the air. Such dehumidification would greatly affect comfort conditions in the space cooled so that higher dry bulb temperatures would appear comfortable, and especially where all or most of the air was recirculated, the power requirements for the dehumidifier should be relatively small compared to those for mechanical refrigeration or air conditioning as just previously described. Additional power might be required for moving more air, since the temperature differential between the underground duct and the cooled space might be relatively small as compared to the normal differential between air conditioner cooling coils and the space being cooled, but should still be considerably less than for conventional air conditioning.

In operation, the herein-described apparatus would preferably be used by the following methods which take into account a wide range of outdoor air temperatures and assume desired indoor temperatures (in the heated, cooled, conditioned building space) of about 65°–70° in heating season and 75°–80° in cooling season.

Figure 3:
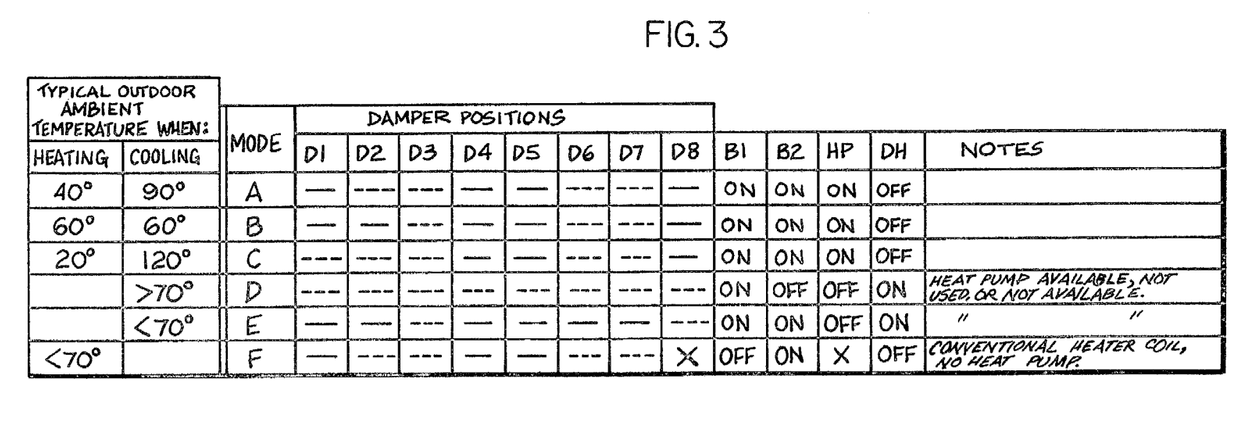
FIG. 3 is a chart showing the operating condition of certain operating and control elements as related to various modes of operation.

Typically, if ambient outdoor air temperature were about 40°, the apparatus should be operated according to the mode A line of FIG. 3. FIG. 3 shows for each mode whether each damper D1–D8 is in solid or broken line position as shown in FIG. 1, and whether the blowers B1 and B2 and the heat pump 24 and dehumidifier 54 (designated HP and DH in FIG. 3) are on or off. Thus, at any time that the thermostat T1 in the building 22 called for heat, the blower B1 would be started, and the comparison section 72 of the control panel 74 would compare the temperatures monitored by the thermostats T0 and T2, and upon finding the 40° outdoor air lower than the typical 50° underground duct air, would cause the control panel 74 to act to put the apparatus in mode A, including switching the heat pump 24 to its heating cycle, and the blower B1 would pull ambient outdoor air into the duct 56 past the damper D1 through the underground duct 20 to expel it past the damper D2 through the duct 34 to and past the damper D8 and through the heat pump ductwork 40 over the normally outdoor coil 42 at the reservoir or normally outdoor side of the heat pump 24. The air would then flow from the ductwork 40 to the inlet extension 28, past the damper D1 and back to the outdoors through the duct 60, dampers D2, D3, D4, and D5 also acting to confine the air to the just-described path. Thereby, the underground duct would exchange heat with the outdoor air passing therethrough, warming and conditioning it to a temperature for increased efficiency of operation of the heat pump 24 as compared to passing ambient outdoor air directly to the coil 42 of the heat pump 24.

If the temperature monitored at the thermostat T0 should then rise to 60°, e.g., the comparison section 72 would detect that the outdoor air temperature was higher than the underground duct air temperature monitored by the thermostat T2, and would cause the control panel 74 to change the apparatus out of mode A into mode B per FIG. 3. Thereby, the blower B1 would pull ambient outdoor air through the duct 56 past the damper D1 through the underground duct 20 and would expel it through the duct 62 past the damper D2 back to the outdoors. At the same time, the heat pump air fan 44 would suck ambient outdoor air through the duct 64 past the damper D3 through the duct 34 past the damper D8 and through the ductwork 40 to expel it over the coil 42 through the inlet extension 28 past the damper D1 and through the duct 60 back to the outdoors. The dampers D4 and D5 also cooperate to confine the air to the just-described path. Therefore, in this mode, ambient outdoor air passes directly to the heat pump 24 for directly exchanging heat therewith for increased efficiency of operation of the heat pump 24 as compared to passing ambient outdoor air through the underground duct 20 to the heat pump 24 as heretofore described, since the ambient outdoor air temperature is higher than would be the temperature of 60° ambient outdoor air after passing through the 50° underground duct.

Similarly, if the thermostat T1 were calling for cooling, or removing heat, from the building 22, e.g., with the ambient outdoor air temperature monitored by the thermostat T0 at about 90°, the panel 74 would act to switch the heat pump 24 to its cooling cycle and to start the blower B1, and the comparison section 72 would compare the temperatures at thermostats T0 and T2 and upon finding the 90° outdoor air temperature to be hotter than the typical 70° underground duct air temperature, the panel 74 would act to put the apparatus in mode A. Mode A operation would continue until the comparison section 72 compared the temperatures at the thermostats T0 and T1 and found the temperature at the thermostat T0 less than the temperature at the thermostat T2, at which time the panel 74 would act to put the apparatus in mode B condition and operation. Thus the mode of the apparatus would automatically selectively be set for the higher efficiency operation of the heat pump 24 available from modes A and B, whether for heating or cooling; and the air path is the same for mode A whether for heating or cooling, and similarly for the mode B air path. Therefore, for the most efficient operation in cooling the indoor air, when the ambient outdoor air would be warmed by passage through the underground duct, the ambient outdoor air should be blown directly on the heat pump outdoor heat exchange coils; and when the outdoor air would be cooled by passage through the underground duct, it should be passed therethrough before blowing it on the heat pump outdoor coils.

Further, since the temperature of the air leaving the coil 42 after exchange of heat therewith is monitored by the thermostat T3, the comparison section 72 is enabled to compare air temperatures at thermostats T0 and T3 as well and to selectively discontinue modes A and B and set the apparatus to mode C condition and operation when mode C is favorable for conditioning the temperature of the air passing coil 42 for increased efficiency of the heat pump 24 operation as compared to modes A and B, typically when the ambient outdoor air temperature drops to about 20° when the heat pump is in heating cycle. In mode C, the blower B1 recirculates the air in the underground duct 20 therethrough, through the outlet duct 34 to and past the damper D8, through the ductwork 40, over the coil 42, and through the inlet extension 28 back to the underground duct 20 ad infinitum. The dampers D1–D5 cooperate to guide the air through the just-described path. Typically, air passing the coil 42 will be cooled by about 25°, so that 20° ambient outdoor air passed through the underground duct 20 and warmed to 50° and blown over the coil 42 would come off the coil 42 at about 25°. Therefore, if the 25° air coming off the coil 42 were recirculated through the underground duct 20 back to the coil 42, keeping the entire exchange of heat between the recirculating air, the coil 42, and the underground duct 20, the recirculating air would arrive at the coil 42 at a slightly higher temperature than in mode B where 20° outdoor air would enter the underground duct 20. Therefore, mode C heat exchange would be favorable to conditioning the temperature of the recirculated air for increased efficiency of operation of the heat pump 24 as respectively compared to either mode A or mode B condition and operation.

Conversely, if the ambient outdoor air temperature were to reach 120°, the ambient outdoor air passed through the underground duct 20 might come out at 90° for heat exchange with the coil 42 and therefore might leave the coil 42 at 90°+25°=115°, such that recirculating the 115° air through the underground duct 20 back to the coil 42 would supply cooler air to the underground duct 20 than the 120° ambient outdoor air, thereby again offering increased efficiency of operation of the heat pump 24 as compared respectively to mode A and B condition and operation at such an ambient air temperature.

During mode A, B and C operation, the blower B2 operates to circulate air from the building 22 through the inlet 30 and the inlet extension 28, to and through the recirculating ductwork 48 to and past the damper D5 and through the upper portion of the outlet duct 34 past the conventional working coil or indoor heat exchange coil 46 at the working side of the heat pump 24 for heat exchange therewith for warming or cooling the indoor air from the building 22 as called for by the thermostat T1, the dampers D4–D7 cooperating to train the air flow through the just-described path.

As an alternative for further economy of energy, the control panel 74 might be set manually to automatically selectively put the apparatus in mode D or E condition and operation, whereby the heat pump 24 would be deactivated and the dehumidifier 54 would be activated. Then, when the ambient outdoor air temperature was greaters than about 70° (or greater than the underground duct air temperature) and mode D was selected, the blower B1 would recirculate air from the building 22 through the inlet 30, the inlet extension 28, the underground duct 20, the outlet duct 34 and past the dehumidifier coil 52 through the outlet 36 back to the building 22 for exchange of heat with the underground duct 20 for removal of sensible heat from the air with little effect on the latent heat therein and for exchange of heat with the dehumidifier coil 52 for removal of latent heat or humidity from the air with little effect on the sensible heat therein. Disposition of the underground duct 20 ahead of the dehumidifier coil 52 in the air flow through the apparatus, as shown in FIG. 1, assures that the sensible heat removal takes place before the latent heat removal, thereby facilitating lowering the air temperature at the coil 52 to the dew point for assuring maximum latent heat removal and minium sensible heat removal from the air at the dehumidifier coil 52. During such operation the dampers D1–D8 cooperate to confine the recirculating air to the just-described path.

If the ambient outdoor air temperature then drops below 70° while indoor cooling was still required (as is typical in many climates), the control panel 74 would automatically selectively act to put the apparatus out of mode D and into mode E condition and operation during such periods when the ambient outdoor air would have greater cooling effect in the building 22 than would ambient outdoor air passed through the underground duct 20 to the building 22, since typically the under-70° outdoor air would be warmed by passage through the underground duct 20 rather than being cooled by removal of sensible heat therefrom as in mode D. In mode E, the blower B1 would pull in ambient outdoor air through the intake duct 56 past the damper D1 and through the underground duct 20 to discharge it past the damper D2 and through the second exhaust duct 62 for cooling the underground duct 20, while the blower B2 would pull ambient outdoor air through the third intake duct 68 past the damper D7 through the inlet extension 28 and through the recirculating ductwork 48 past the damper D5 through the upper portion of the outlet duct 34 past the dehumidifier coil 52 through the outlet 36 and through the building 22 and to the outdoors past the damper D6 through the duct 66. A portion of the air from the building 22 would be recirculated through the inlet 30 and the inlet extension 28 back to the recirculating ductwork 48 and the blower B2 for passage with the ambient outdoor air from the third intake duct 68 to the coil 52 and back to the building 22 for its evaporative cooling effect in 22. Such recirculation is desirable, since the relative humidity of ambient outdoor air during such cool outdoor temperature conditions is frequently rather high, and if 100 percent outdoor air were pulled in, the dehumidifier 54 and its coil 52 might not be able to remove enough latent heat or humidity therefrom to maintain reasonable comfort conditions in the building 22. Thermostat T0, T2 comparison in the panel 74 would set the modes.

In another alternative embodiment, the heat pump 24 and its associated ductwork 40, heat exchange coil 42, air fan 44, and damper D8 might be eliminated completely as aforesaid herein, substituting therefore any suitable conventional heat source (not shown) for connection to the working coil 46. Such a heat source (not shown) could be a conventional electric or gas hot water heater, a solar water heater, or any other convenient means of heating the coil 46, including converting the coil 46 to conventional electric resistance heating coils. Then, when heating was desired for the building 22 as indicated by the thermostat T1, the control panel 74 would act to put the apparatus out of mode D and E and into mode F when the ambient outdoor air temperature was below 70°, whereby the blower B2 would recirculate air from the building 22 through the inlet 30, the inlet extension 28, and the recirculating ductwork 48 past the damper D5 and through the upper portion of the duct 34 past the coil 46 and through the outlet 36 back to the building 22, thereby providing heated air off the coil 46 for the building 22. A further desirable alternative could be the adjustment of the damper D5 so that it would not completely close off thereat the upper portion of the outlet duct 34 from the lower portion thereof, whereby the current of air rushing past the damper D5 and through the upper portion of the duct 34 would induce a flow of ambient outdoor air through the intake duct 56 past the damper D1 and through the underground duct 20 and the lower portion of the outlet duct 34 past the damper D5. This induced air flow would be tempered in temperature by its passage through the underground duct 20 and would serve to pressurize the building 22 slightly, thereby preventing the inflow of cold air currents which normally seep in to a heated building 22.

Since the design of controls such as the control panel 74 is well within the ability of those ordinarily skilled in the art, the components are commercially available, and the details of the control panel 74 form no part of the present invention, no detailed circuit diagram for the control panel 74 has been included in this disclosure; but the schematic diagram of FIG. 2 shows the control relations amongst the various control and operating components, and FIG. 1 shows the physical relationship of the just-aforesaid components to the ductwork and the building structure of the present invention. The ductwork, controls, and operating components, and the physical and sequential arrangements thereof are subject to infinite variation from those of the embodiment herein disclosed, but the particular embodiment disclosed in full detail herein and illustrated in the drawings has been provided for disclosure purposes only and is not intended to limit the scope of the present invention, which is to be determined by the scope of the appended claims.

We claim:

1. An energy-conserving method for exchanging heat between air and a heat pump at the reservoir side thereof for enabling heat exchange between the working side of said heat pump and indoor air thereat, said method including the use of underground duct means, said method comprising:
   (a) passing ambient outdoor air to said heat pump through said duct means for exchanging heat between said passing air and said duct means when said exchange is favorable to condition the temperature of said ambient air for increased efficiency of operation of said heat pump as compared to passing ambient outdoor air directly to said heat pump for said exchanging heat therewith; and
   (b) selectively discontinuing step (a) while passing ambient outdoor air directly to said heat pump for directly exchanging heat therebetween when the temperature of said ambient air passing directly to said heat pump is favorable for increased efficiency of operation of said heat pump as compared to passing air through said duct means to said heat pump, while passing other ambient outdoor air through said duct directly back to the outdoors for exchanging heat between said duct and said other air passing therethrough.

2. An energy-conserving method of exchanging heat with a heat pump according to claim 1 and characterized further in that said method is used for warming indoor air and said passing ambient air through said duct means to said heat pump in step (a) is performed when said ambient air would be warmed thereby and said passing air directly to said heat pump in step (b) is performed when said ambient air would be cooled by said passing through said duct means as in step (a).

3. An energy-conserving method of exchanging heat with a heat pump according to claim 1 and characterized further in that said method is used for cooling indoor air and said passing ambient air through said duct means to said heat pump in step (a) is performed when said ambient air would be cooled thereby and said passing air directly to said heat pump in step (b) is performed when said ambient air would be warmed by said passing through said duct means as in step (a).

4. An energy-conserving method for exchanging heat between air and a heat pump at the reservoir side thereof for enabling heat exchange between the working side of said heat pump and indoor air thereat, said method including the use of underground duct means, said method comprising:
(a) passing ambient outdoor air to said heat pump through said duct means for exchanging heat between said passing air and said duct means when said exchange is favorable to condition the temperature of said ambient air for increased efficiency of operation of said heat pump as compared to passing ambient outdoor air directly to said heat pump for said exchanging heat therewith;
(b) selectively discontinuing step (a) while passing ambient outdoor air directly to said heat pump for directly exchanging heat therebetween when the temperature of said ambient air passing directly to said heat pump is favorable for increased efficiency of operation of said heat pump as compared to passing air through said duct means to said heat pump; and
(c) selectively discontinuing steps (a) and (b) while recirculating air to and from said heat pump through said duct means for exchanging heat between said recirculating air and said duct means and between said recirculating air and said heat pump when said exchange is favorable to condition the temperature of said recirculating air for increased efficiency of operation of said heat pump as respectively compared to passing ambient outdoor air through said duct means to said heat pump and passing ambient outdoor air directly to said heat pump.

5. An energy-conserving method of exchanging heat with a heat pump according to claim 4 and characterized further in that said method is used for warming indoor air and said recirculating air to and from said heat pump through said duct means in step (c) is performed when said air recirculating from said heat pump to said duct means would be warmer than ambient outdoor air.

6. An energy-conserving method of exchanging heat with a heat pump according to claim 4 and characterized further in that said method is used for cooling indoor air and said recirculating air to and from said heat pump through said duct means in step (c) is performed when said air recirculating from said heat pump to said duct means would be cooler than ambient outdoor air.

7. An energy-conserving method of exchanging heat with a heat pump according to claim 4 and characterized further by a time period during which said method is used for warming indoor air and said passing ambient air through said duct means to said heat pump in step (a) is performed when said ambient air would be warmed thereby, said passing air directly to said heat pump in step (b) is performed when said ambient air would be cooled by said passing through said duct means as in step (a), and said recirculating air to and from said heat pump through said duct means in step (c) is performed when said air recirculating from said heat pump to said duct means would be warmer than ambient outdoor air; and by another time period during which said method is used for cooling indoor air and said passing ambient air through said duct means to said heat pump in step (a) is performed when said ambient air would be cooled thereby, and said passing air directly to said heat pump in step (b) is performed when said ambient air would be warmed by said passing through said duct means as in step (a).

8. Heat pump apparatus for exchanging heat between indoor air in a space at the working side thereof and ambient outside air comprising a heat pump having means for exchange of heat with said outside ambient air, means for exchange of heat with air in said space, underground duct means, selective means for (a) moving outside air through said duct past said means for exchange of heat with said outside air and (b) moving outside air directly to said means for exchange of heat with said outside air, and additional selective means for (c) recirculating air to and from said heat pump through said duct for exchanging heat between said recirculating air and said duct and between said recirculating air and said heat pump.

9. Heat pump apparatus for exchanging heat between indoor air in a space at the working side thereof and ambient outside air comprising a heat pump having means for exchange of heat with said outside ambient air, means for exchange of heat with air in said space, underground duct means, selective means for (a) moving outside air through said duct past said means for exchange of heat with outside air and (b) moving outside air directly to said means for exchange of heat with said outside air, and selective means for moving other outside air through said duct for return directly to the outside simultaneously with said moving outside air directly to said means for exchange of heat with said outside air.

* * * * *